US011347702B2

(12) United States Patent
Govindaraj et al.

(10) Patent No.: US 11,347,702 B2
(45) Date of Patent: May 31, 2022

(54) MIGRATION OF DATA IN A SYSTEM HAVING MULTI-TIERED PHYSICAL STORAGE

(71) Applicant: Hewlett Packard Enterprise Development LP, Houston, TX (US)

(72) Inventors: Mohan Govindaraj, Bangalore Karnataka (IN); Ashutosh Kumar, Bangalore Karnataka (IN); V. V. Satyanarayana Reddy N, Bangalore Karnataka (IN); Rachit Gupta, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/073,316

(22) Filed: Oct. 17, 2020

(65) Prior Publication Data
US 2021/0191910 A1    Jun. 24, 2021

(30) Foreign Application Priority Data
Dec. 19, 2019  (IN) .............................. 201941053014

(51) Int. Cl.
*G06F 16/00* (2019.01)
*G06F 16/21* (2019.01)
*G06F 9/455* (2018.01)
*G06F 16/16* (2019.01)

(52) U.S. Cl.
CPC ........ *G06F 16/214* (2019.01); *G06F 9/45558* (2013.01); *G06F 16/164* (2019.01); *G06F 2009/45583* (2013.01)

(58) Field of Classification Search
CPC .... G06F 16/119; G06F 16/164; G06F 16/214; G06F 9/45558; G06F 2009/45583
See application file for complete search history.

(56) References Cited

U.S. PATENT DOCUMENTS

| 7,480,912 B2 | 1/2009 | Arnold et al. |
| 8,224,782 B2 | 7/2012 | Murase |
| 8,549,518 B1 | 10/2013 | Aron et al. |
| 8,682,955 B1 | 3/2014 | Monden et al. |

(Continued)

OTHER PUBLICATIONS

Alam et al., "A Decision Matrix and Monitoring based Framework for Infrastructure Performance Enhancement in A Cloud based Environment," Computer Science: ArXiv, Dec. 2014, pp. 174-180.

*Primary Examiner* — Diedra McQuitery
(74) *Attorney, Agent, or Firm* — Hewlett Packard Enterprise Patent Department

(57) ABSTRACT

Examples described herein relate to migrating data in a system having multi-tiered physical storage. In an example, relative weights corresponding to a plurality of data access parameters may be determined based on a ranking associated with each of the plurality of data access parameters. Further, a priority metric corresponding to each of a plurality of candidate types may be determined based on the relative weights of the plurality of data access parameters. Furthermore, one or more candidate types may be selected from the plurality of candidate types based on the priority metric corresponding to each of the plurality of candidate types. Moreover, data containers corresponding to the selected one or more candidate types may be migrated from a first tier storage to a second tier storage.

20 Claims, 6 Drawing Sheets

(56) References Cited

U.S. PATENT DOCUMENTS

| | | |
|---|---|---|
| 9,477,407 B1 | 10/2016 | Marshak |
| 10,095,418 B1* | 10/2018 | Gong .................... G06F 3/0689 |
| 11,048,671 B2 | 6/2021 | Middlecamp et al. |
| 2012/0036327 A1 | 2/2012 | Jennas, II |
| 2017/0177224 A1 | 6/2017 | Glover |
| 2017/0228193 A1 | 8/2017 | Olson et al. |
| 2017/0329552 A1* | 11/2017 | Baldwin ............... G06F 3/0649 |
| 2018/0349034 A1* | 12/2018 | Lv ......................... G06F 3/0631 |
| 2019/0026030 A1 | 1/2019 | Yang |
| 2020/0327017 A1* | 10/2020 | Vijayan ............... G06F 11/1469 |

* cited by examiner

| WAITER COUNT (A) | DATA CONSUMPTION TREND (B) | FILESYSTEM METADATA VOLUME TYPE (C) | USER DATA VOLUME TYPE (D) |
|---|---|---|---|
| - | A | A | A |
| - | - | B | B |
| - | - | - | C |
| - | - | - | - |

FIG. 2

| DATA ACCESS PARAMETER | WAITER COUNT | DATA CONSUMPTION TREND | FILESYSTEM METADATA VOLUME TYPE | USER DATA VOLUME TYPE | PRIORITY METRIC |
|---|---|---|---|---|---|
| RELATIVE WEIGHTS | 50 | 33 | 16 | 1 | |
| CANDIDATE TYPE (CT) | | | | | |
| TYPE-1 | 500 | 2640 | 0 | 1 | 3141 |
| TYPE-2 | 250 | 1650 | 16 | 0 | 1916 |
| TYPE-3 | 0 | 825 | 0 | 1 | 826 |
| TYPE-4 | 500 | 0 | 16 | 0 | 516 |
| TYPE-5 | 2500 | 495 | 0 | 1 | 2996 |
| TYPE-6 | 1250 | 330 | 16 | 0 | 1596 |
| TYPE-7 | 0 | 165 | 0 | 1 | 166 |

FIG. 3

MIGRATION OF DATA IN A SYSTEM HAVING MULTI-TIERED PHYSICAL STORAGE

BACKGROUND

Data may be stored on computing systems (hereinafter referred to as computing nodes), such as, but not limited to, servers, computer appliances, workstations, storage systems, or converged or hyper-converged systems. To store data, some computing nodes may utilize a data virtualization platform that abstracts, into a data store (i.e., virtualized or logical storage), aspects of a physical storage. The physical storage may include storage devices arranged in multiple storage tiers.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein:

FIG. 2 depicts a pairwise comparison matrix, in accordance with an example;

FIG. 3 depicts an example weighted decision matrix, in accordance with another example;

Figure 1:
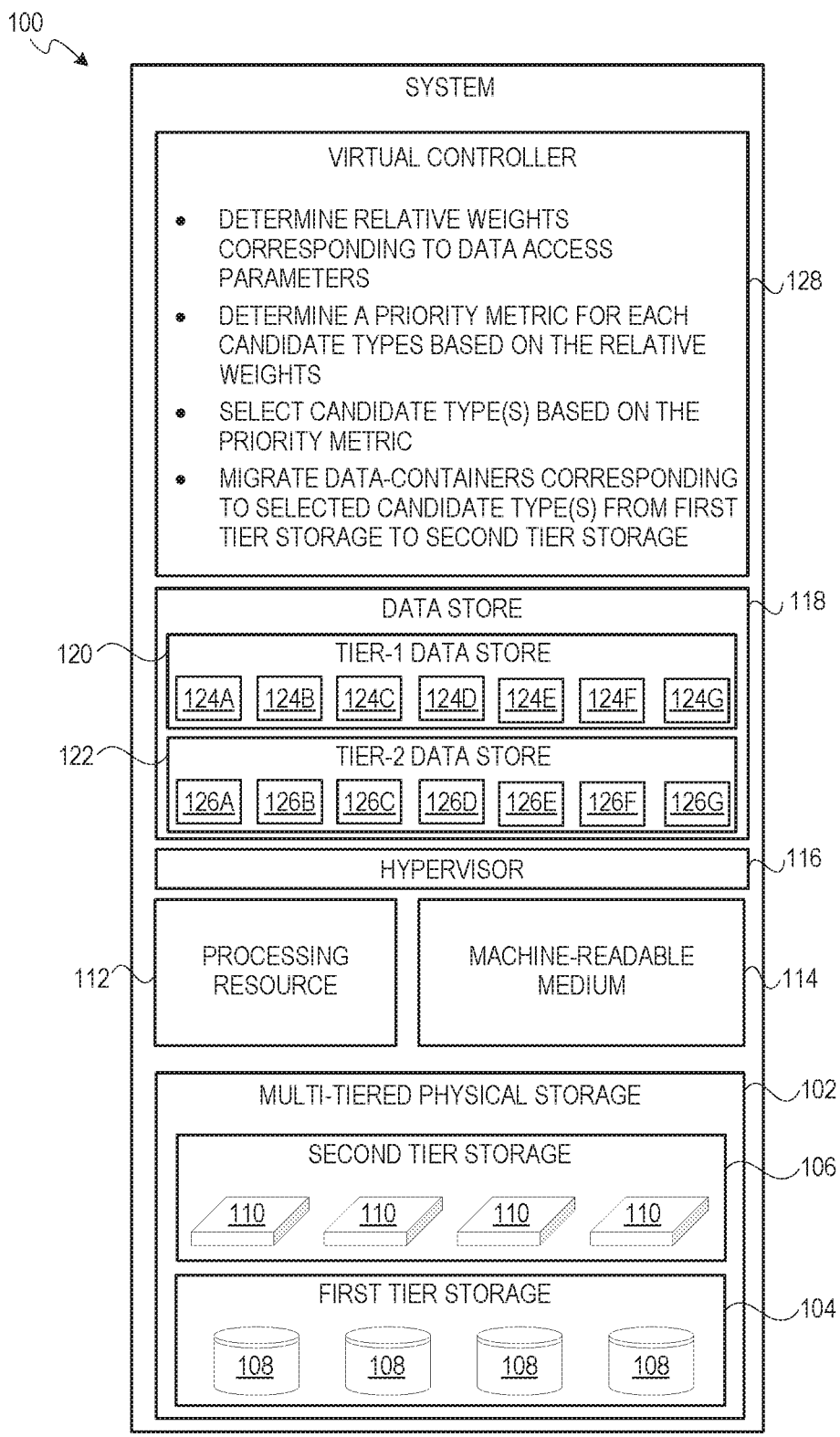
FIG 1 illustrates a system including a multi-tiered physical storage, in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, etc., may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Data may be stored on computing systems (hereinafter referred to as computing nodes), such as, but not limited to, servers, computer appliances, workstations, storage systems, or converged or hyper-converged systems. To store data, some computing nodes may utilize a data virtualization platform that abstracts, into a data store (Le., virtualized or logical storage), aspects of a physical storage. The physical storage may include storage devices arranged in multiple storage tiers The physical storage underlying the data store may be implemented using hardware, such as, hard disk drives (HDDs), solid state drives (SSDs), and the like. Certain storage systems may implement a multi-tiered physical storage to achieve balance between performance and cost. In such multi-tiered physical storage, data may be stored in various types of storage devices depending on criteria, such as, security of the data, data recovery needs, data access speed, frequency of data access, and the like. By way of example, storage devices that may support higher data access rates or data access with low latency, such as, SSDs, an SSD array, a flash memory or a flash storage, a flash array, may be used as one tier of the multi-tiered physical storage. Further, storage devices that may support lower data access rates or data access with higher latency, such as, HDDs may be used as another tier of the multi-tiered physical storage. It is apparent that cost per unit of storage is much higher for SSDs than it is for the HDDs. Therefore, typical multi-tiered storage systems are designed to have a lower storage capacity of a storage tier using costly storage devices (e.g., SSDs) in comparison to a storage tier that uses relatively cheaper storage devices (e.g., HDDs). The storage tiers in the multi-tiered physical storage may also be differentiated based on respective RAID configuration, The data store may store aspects of a physical storage such as addressing, configurations, metadata, user data, and the like. In some implementations, the data store may be implemented, maintained, and managed, at least in part, by a virtual controller. The data store may be referenced by a user environment (e.g., to an operating system, applications, processes, etc.). The data in the data store may be divided into storage chunks, hereinafter referred to as data containers. The data containers in the data store may support different object sizes (e.g., 1 kb, 2 kb, 4 kb, 8 kb, 16 kb, 32 kb, 64 kb, etc.).

Depending on various data access operations, data may be migrated from a storage tier to another storage tier in the multi-tiered physical storage. Such migration of data may be facilitated by the virtual controller by causing movement of the data containers in the data store. Generally, when a data migration is effected, the data containers may be moved across storage tiers for achieving effective space utilization. Data migration jobs are generally allocated with limited system resources in terms of CPU and memory utilization. Given these constraints, it is useful if such data migration jobs are efficient. Existing data migration approaches may lack identification of appropriate data containers, which may lead to inefficient storage space utilization across the storage tiers.

In accordance with various aspects, the present disclosure provides, among other things, a method for migrating data that may lead to efficient space utilization across storage tiers in the multi-tiered physical storage. In some examples, a method includes determining relative weights corresponding to a plurality of data access parameters based on a ranking associated with each of the plurality of data access parameters. The data access parameters may be various input-output (IO) pattern parameters, such as but not limited to, a waiter count, a data consumption trend, a data type (e.g., a filesystem metadata volume type or a user data volume type), or combinations thereof. Further, a priority metric for each of a plurality of candidate types (e.g., object size) may be determined based on the relative weights of the plurality of data access parameters. Furthermore, one or more candidate types from the plurality of candidate types may be selected based on the priority metric corresponding to each of the plurality of candidate types. Data containers corresponding to the selected one or more candidate types may be migrated from a first tier storage to the second tier storage.

As will be appreciated, example implementations presented herein facilitate selection of candidate types and allows migration of the data containers corresponding to the selected candidate types. Accordingly, storage wastage leading to partially filled data containers may be minimized and storage space in the multi-tiered storage system may be effectively utilized.

FIG. 1 illustrates a system 100 including a multi-tiered physical storage 102, in accordance with an example. The system 100 may refer to any electronic device capable of storing, processing, and/or manipulating data and may have a processing resource to perform one or more operations according to programming instructions. Examples of the system 100 may include, but are not limited to, a desktop computer, a laptop, a smartphone, a server, a computer appliance, a workstation, a storage system, or a converged or hyperconverged system, and the like, In some examples, the system 100 may be a mufti-tiered storage system.

As depicted in FIG. 1, the system 100 may include the multi-tiered physical storage 102. In such mufti-tiered physical storage 102, data may be stored in various types of storage devices depending on criteria, such as, security of the data, data recovery needs, data access speed, frequency of data access, and the like. In some examples, the multi-tiered physical storage 102 may include storage tiers such as a first tier storage 104 and a second tier storage 106. In some examples, although not shown in FIG. 1, the multi-tiered physical storage 102 may include one or more storage tiers in addition to the first tier storage 104 and the second tier storage 106.

The second tier storage 106 may include storage devices 108 that may support higher data access rates or data access with low latency. Examples of the storage devices 108 may include, but are not limited to, SSDs, an SSD array, a flash storage device, a flash array, Further, the first tier storage 104 may include storage devices 110 that may support lower data access rates or data access with higher latency in comparison to the storage devices 108. Example of the storage devices 110 may include, but are not limited to, an HDD. It is apparent that cost per unit of storage is much higher for the storage devices 108 in comparison to the storage devices 110. The storage tiers (e.g., the first tier storage 104 and the second tier storage 106) in the multi-tiered physical storage 102 may also be differentiated based on respective RAID configuration.

Further, the system 100 may include a processing resource 112 and a machine-readable medium 114. The machine-readable medium 114 may be any electronic, magnetic, optical, or other physical storage device that may store data and/or executable instructions (see FIG. 7). Therefore, the machine-readable medium 114 may be, for example, Random Access Memory (RAM), an Electrically Erasable Programmable Read-Only Memory (EEPROM), a storage drive, a flash memory, a Compact Disc Read Only Memory (CD-ROM), and the like. The machine-readable medium 114 may be non-transitory. As described in detail herein, the machine-readable medium 114 may be encoded with executable instructions for performing one or more methods, for example, methods described in FIGS. 4-6. In certain examples, the machine-readable medium may be implemented inside the multi-tiered physical storage 102, separately or within one or both of the first tier storage 104 and the second tier storage 106.

The processing resource 112 may be a physical device, for example, one or more central processing unit (CPU), one or more semiconductor-based microprocessors, one or more graphics processing unit (GPU), application-specific integrated circuit (ASIC), a field programmable gate array (FPGA), other hardware devices capable of retrieving and executing of the instructions (see FIG. 7) stored in the machine-readable medium 114, or combinations thereof. The processing resource 112 may fetch, decode, and execute the instructions to manage migration of the data (described later). As an alternative or in addition to executing the instructions, the processing resource 112 may include at least one integrated circuit (IC), control logic, electronic circuits, or combinations thereof that include a number of electronic components for performing the functionalities intended to be performed by the system 100.

Furthermore, in some examples, the system 100 may include a hypervisor 116. The hypervisor 116 may be a computer program, firmware, or a hardware that may facilitate hosting of one or more operating system instances on a common processing resource, for example, the processing resource 112. Such operating system instance hosted or installed on the hypervisor 116 may be referred to as a virtual machine. Accordingly, the hypervisor 116 may provide a host operating system for the virtual machine. The hypervisor 116 may be type-1 hypervisor (also referred to as "bare-metal hypervisor") or type-2 (also referred to as "hosted hypervisor").

Moreover, the system 100 may include a data store 118. The data store 118 may represent a virtualized storage that may include aspects (e.g., addressing, configurations, etc.) abstracted from data stored in the multi-tiered physical storage 102. The data store 118 may be presented to a user environment (e.g., to the virtual machines, an operating system, applications, processes, etc.) hosted on the system 100. In some examples, the data store 118 may also provide data services such as deduplication, compression, replication, and the like. In some examples, the data store 118 may be an object-based data store. In the object-based data store 118, data may be stored as objects. The data store 118 may include an object store (not shown). User accessible files and directories may be made up of multiple objects. Each object may be identified by a signature (also referred to as an object fingerprint), which, in some implementations, may include a cryptographic hash digest of the content of that object. The signature can be correlated to a physical address (i.e., disk location) of the object's data in an object index.

In some examples, the data store 118 may include a first tier data store 120 (labeled as TIER-1 DATA STORE in FIG. 1) and a second tier data store 122 (labeled as TIER-2 DATA STORE in FIG. 1). The first tier data store 120 and the second tier data store 122 may store data containers corresponding to the first tier storage 104 and the second tier storage 106, respectively. The term "data container" (also known as "extents") as used herein may refer to a logical representation of a chunk of storage that may occupy contiguous or non-contiguous space in the multi-tiered physical storage 102. For example, the first tier data store 120 may contain data containers 124A, 124B, 124C, 124D, 124E, 124F, 124G (hereinafter collectively referred to as data containers 124) that are logical representations of storage chunks in the first tier storage 104. Similarly, the second tier data store 122 may contain data containers 126A, 126B, 126C, 126D, 126E, 126F, 126G (hereinafter collectively referred to as data containers 126) that are logical representations of storage chunks in the second tier storage 106.

In some examples, the data containers 124 and 126 may support different object sizes, for example, object sizes of 1 kb, 2 kb, 4 kb, 8 kb, 16 kb, 32 kb, 64 kb, etc. By way of example, a data container supporting the object size of 2 kb can store a predetermined number of objects having the object size of 2 kb depending on a storage size of the data container. For example, if the storage size of the data container supporting the object size of 2 kb is 256 kb, such data container can store up to 128 objects having the object size of 2 kb. In an example presented in FIG. 1, the data containers 124A, 124B, 124C, 124D, 124E, 124F, and 124G in the first tier data store 120 may support the object sizes of 1 kb, 2 kb, 4 kb, 8 kb, 16 kb, 32 kb, and 64 kb, respectively. Similarly, the data containers 126A, 126B, 126C, 126D, 126E, 126F, and 126G in the second tier data store 122 may support the object sizes of 1kb, 2 kb, 4 kb, 8 kb, 16 kb, 32 kb, and 64 kb, respectively.

In each of the first tier data store 120 and the second tier data store 122 of FIG. 1, a single data container corresponding to each of the object sizes is presented for illustration purposes. The first tier data store 120 and the second tier data store 122 may also include more than one data containers corresponding to various object sizes. Further, the first tier data store 120 and the second tier data store 122 need not necessarily support all of the object sizes 1kb, 2 kb, 4 kb, 8 kb, 16 kb, 32 kb, and 64 kb. Also, in some examples, additional data containers supporting other data sizes that are not listed herein (e.g., 128 kb, 256 kb, etc.) may be stored in the first tier data store 120 and the second tier data store 122.

In some examples, the object size may also define a candidate type of data containers. For example, a Table-1 represents candidate types and corresponding object sizes and example data containers.

TABLE 1

Relationship among the candidate types,
object size, and data containers

| Candidate Type | Object Size | Example Data Containers |
|---|---|---|
| Type-1 | 1 kb | 124A, 126A |
| Type-2 | 2 kb | 124B, 126B |
| Type-3 | 4 kb | 124C, 126C |

TABLE 1-continued

Relationship among the candidate types,
object size, and data containers

| Candidate Type | Object Size | Example Data Containers |
|---|---|---|
| Type-4 | 8 kb | 124D, 126D |
| Type-5 | 16 kb | 124E, 126E |
| Type-6 | 32 kb | 124F, 126F |
| Type-7 | 64 kb | 124G, 126G |

As depicted in Table-1, the candidate types Type-1, Type-2, Type-3, Type-4, Type-5, Type-6, and Type-7 may correspond to the object sizes of 1 kb, 2 kb, 4 kb, 8 kb, 16 kb, 32 kb, and 64 kb, respectively.

Further, in some examples, the data store 118 may be implemented, maintained, and managed, at least in part, by a processor based system such as a virtual controller 128. By way of example, the virtual controller 128 may be implemented using hardware devices (e.g., electronic circuitry, logic, or processors) or any combination of hardware and programming (e.g., instructions stored on the machine-readable medium 106) to implement various functionalities described herein. For example, the virtual controller 128 may be a virtual machine hosted on the hypervisor 116. In some examples, the virtual controller 128 may include, at least in part, instructions stored on the machine-readable medium 114 and executing on the processing resource 112. In some examples, the virtual controller 128 may implement file protocol unit (not shown) based on a file access protocol such as server message block (SMB) v3, for example. A client such as the hypervisor 116 may connect with the virtual controller 128 via an IP address of the virtual controller 128 and communicate data access requests (e.g., file open, read, write, file rename, file move, file close, etc.) to the virtual controller 128 using the file access protocol, such as SMB v3, for example.

Depending on various operations performed in the system 100, data may be migrated from one storage tier to another storage tier in the multi-tiered physical storage 102. Such migration of data may be facilitated by the virtual controller 128 by causing movement of one or more of the data containers 124, 126 within the data store 118 from the first tier data store 120 to the second tier data store 122, or vice versa. To facilitate such data migration, the virtual controller 128 may determine relative weights corresponding to a plurality of data access parameters.

The data access parameters may be various input-output (IO) pattern parameters. Examples of the IO pattern parameters may include, but are not limited to, a waiter count, a data consumption trend, a data type, or combinations thereof. The "waiter count" may refer to a count of data access requests corresponding to a given candidate type. Further, the "data consumption trend" may refer to heuristic of IO pattern consumption corresponding to a given candidate type. The "data type" may refer to any of a filesystem metadata volume type or a user data volume type. It is to be noted that other type of data access parameters in addition to, alternatively, or in combination with abovementioned data access parameters may be used to manage miaration of data in the system 100. Further, it is to be noted that the present disclosure is not limited to a number of the data access parameters and types of the data access parameters.

In some examples, the data access parameters may be ranked by a user or an administrator or the system 100. In some other examples, the data access parameters may be ranked by the virtual controller 128 based on various user defined rules and/or learning from past experiences regarding data access in the system 100. Accordingly, each data access parameter may have an associated ranking. Ranking of the data access parameters may include determining relative priority among the data access parameters. For example, Table-2 represented below depicts an ordered list of the data access parameters, in accordance with one example.

TABLE 2

Ranking of the data access parameters

| Data Access Parameter | Ranking |
|---|---|
| Waiter Count | 1 |
| Data Consumption Trend | 2 |
| Filesystem Metadata Volume Type | 3 |
| User Data Volume Type | 4 |

In an example depicted in Table-2, the data access parameter—waiter count is assigned the highest ranking, while data access parameter—user data volume type is assigned the lowest ranking among the four data access parameters. Further, in Table-2, the data access parameters are arranged in a descending order of ranking, for example. For instance, value "1" in the ranking column may represent highest rank while value "4" may represent the lowest rank among the four rankings. Although, the ranking is identified as numerical value in Table-2, any other suitable representation may also be used.

Further, in some examples, the virtual controller 128 may also perform a pairwise comparison among the data access parameters (see FIG. 2) to determine the relative weights corresponding to each data access parameter. Referring now to FIG. 2, a pairwise comparison matrix 200 is presented, in accordance with an example. The pairwise comparison matrix 200 may be defined based on the ranking associated with the data access parameters. The pairwise comparison matrix 200 includes a criteria column 202 and a criteria row 204.

Further, in the pairwise comparison matrix 200, the data access parameters such as the waiter count, the data consumption trend, the filesystem metadata volume type, and the user data volume type are represented as labels "A," "B," "C," and "D," respectively. As depicted in the pairwise comparison matrix 200, for example, in comparison between the wafter count (see the criteria column 202) and the data consumption trend (see the criteria row 204), the waiter count is given preference which is indicated by marking the label "A" in an intersection cell. Similarly, the waiter count (see the criteria column 202) is given preference over the parameters the filesystem metadata volume type and the user data volume type. Accordingly, intersecting cells of the waiter count (see the criteria column 202) and the filesystem metadata volume type (see the criteria row 204) and the user data volume type (see the criteria row 204) are marked with label "A."

Further, the data consumption trend (see the criteria column 202) is given preference over the parameters the filesystem metadata volume type and the user data volume type. Accordingly, intersecting cells of the data consumption trend (see the criteria column 202) and the filesystem metadata volume type (see the criteria row 204) and the user data volume type (see the criteria row 204) are marked with label "B." Also, in some examples, in comparison between the filesystem metadata volume type (see the criteria column 202) and the user data volume type (see the criteria row 204), the filesystem metadata volume type is given preference which is indicated by marking label "C" in an intersection cell.

Referring back to FIG. 1, in some examples, such pairwise comparison among the data access parameters may be used by the virtual controller 128 to determine relative weight of each of the data access parameter. For example, if each of the labels "A," "B," "C," and "D," are represented as "X" (i.e., assuming linear proportion among the data access parameter) and the total of all weights to be 100%, following equation (1) may represent the total weight.

$$100\% = 3X + 2X + 0X \qquad \text{Equation (1)}$$

By solving equation (1), X may be obtained as 16.67% (~16%). Accordingly, a relative weight of the waiter count may be determined as 50%, a relative weight of the data consumption trend may be determined as 33%, a relative weight of the filesystem metadata volume type may be determined as 16%. In some examples, round-off errors from calculations of the relative weights may be gathered to determine a relative weight of the user data volume type as 1%. As will be understood, the value of X, hence, the relative weights of the data access parameters may vary depending on a number of the data access parameters. In some examples, the virtual controller 128 may store the determined values of the relative weights of the data access parameters in the machine-readable medium 114.

As will be appreciated, the present disclosure is not limited with respect to using the pairwise comparison matrix to determine the relative weights of the data access parameters. Any other technique or calculation may also be implemented to determine the relative weights of the data access parameters based on the ranking corresponding to the data access parameters, the number of the data access parameters, any user preferences/inputs, any customization criteria, or combinations thereof, without limiting the scope of the present disclosure.

During operation of the system 100, the system 100 may receive number of data access/IO requests. In some examples, the data access requests received in a given time window may be analyzed by the virtual controller 128. Further, a priority metric corresponding to each of a plurality of candidate types (e.g., object size) may be determined based on the relative weights of the plurality of data access parameters. For the data access requests received in the given time window, the virtual controller 128 may determine values of the data access parameters corresponding to each of the candidate types. Table-3 may represent example values of the candidate types corresponding to each of the example data access parameters collected in the given time window. It is to be noted that these values are merely represented for illustration purposes and do not limit the scope of the present disclosure in any manner.

TABLE 3

Example values of the candidate types

| | Waiter count | Data consumption trend | Filesystem metadata volume type | User data volume type |
|---|---|---|---|---|
| Type-1 | 10 | 80 | 0 | 1 |
| Type-2 | 5 | 50 | 1 | 0 |
| Type-3 | 0 | −25 | 0 | 1 |
| Type-4 | 10 | 0 | 1 | 0 |
| Type-5 | 50 | 15 | 0 | 1 |

TABLE 3-continued

Example values of the candidate types

|  | Waiter count | Data consumption trend | Filesystem metadata volume type | User data volume type |
|---|---|---|---|---|
| Type-6 | 25 | 10 | 1 | 0 |
| Type-7 | 0 | 5 | 0 | 1 |

In some examples, the virtual controller 128 may determine the priority metric corresponding to each of the plurality of candidate types based on values of the plurality of data access parameters corresponding to each of the plurality of candidate types and the relative weights corresponding to the plurality of data access parameters. An example weighted decision matrix (see FIG. 3) may illustrate an example scenario for determining the priority metric corresponding to each of the plurality of candidate types (Type-1 through Type-7).

Referring now to FIG. 3, an example weighted decision matrix 300 is presented. In the example weighted decision matrix 300, a row 302 represents different data access parameters and a row 304 represents the relative weights corresponding to the data access parameters listed in the row 302. Further, a column 306 lists the candidate types. Moreover, a column 308 may represent priority metric corresponding to the candidate types listed in the column 306.

In the description herein after, an example calculation of the priority metric corresponding to the Type-1 candidate will be described. As will be understood, the priority metric corresponding to other candidate types may be determined in a similar fashion as described with reference to the Type-1 candidate. As previously noted, in the given time window, the values of the Type-1 candidate corresponding to the waiter count, the data consumption trend, the filesystem metadata volume type, and the user data volume type are 10, 80%, 0, and 1, respectively (see Table-3). Accordingly, in one example, values in cells 312, 314, 316, and 318 of the weighted decision matrix 300 may represent multiplication product of the values of the Type-1 candidate corresponding to the data access parameters and respective relative weights of the data access parameters. For example, a value depicted in the cell 312 may be obtained by multiplying 10 (e.g., value of the Type-1 candidate corresponding to the waiter count, see Table-3) with 50 (e.g., the relative weight of the waiter count). Moreover, the priority metric corresponding to the Type-1 candidate may be obtained by summing values in the cells 312, 314, 316, and 318, for example. It may be noted that, any other types of calculations may also implemented to determine the priority metric corresponding to various candidate types.

Turning again to FIG. 1 once the priority metric corresponding to each of the candidate types is determined, the virtual controller 128 may select one or more candidate types from the plurality of candidate types. The virtual controller 28 may select the one or more candidate types based on the priority metric corresponding to each of the plurality of candidate types. Additional details regarding selection of the candidate types will be described in conjunction with the method described in FIG. 5. Further, the virtual controller 128 may migrate one or more data containers corresponding to the selected one or more candidate types from the first tier storage 104 to the second tier storage 106, for example. In some examples, in order to accomplish the migration of the data containers from the first tier storage 104 to the second tier storage 106, the virtual controller 128 may migrate the data containers from the first tier data store 120 to the second tier data store 122. Such changes in the data stores may be reflected in the respective storage tiers 104 and 106.

As will be appreciated, the system 100 presented herein facilitates selection of candidate types and allows migration of the data containers corresponding to the selected candidate types. Accordingly, storage wastage leading to partially filled data containers may be minimized and storage space in the multi-tiered storage system may be effectively utilized.

Figure 4:
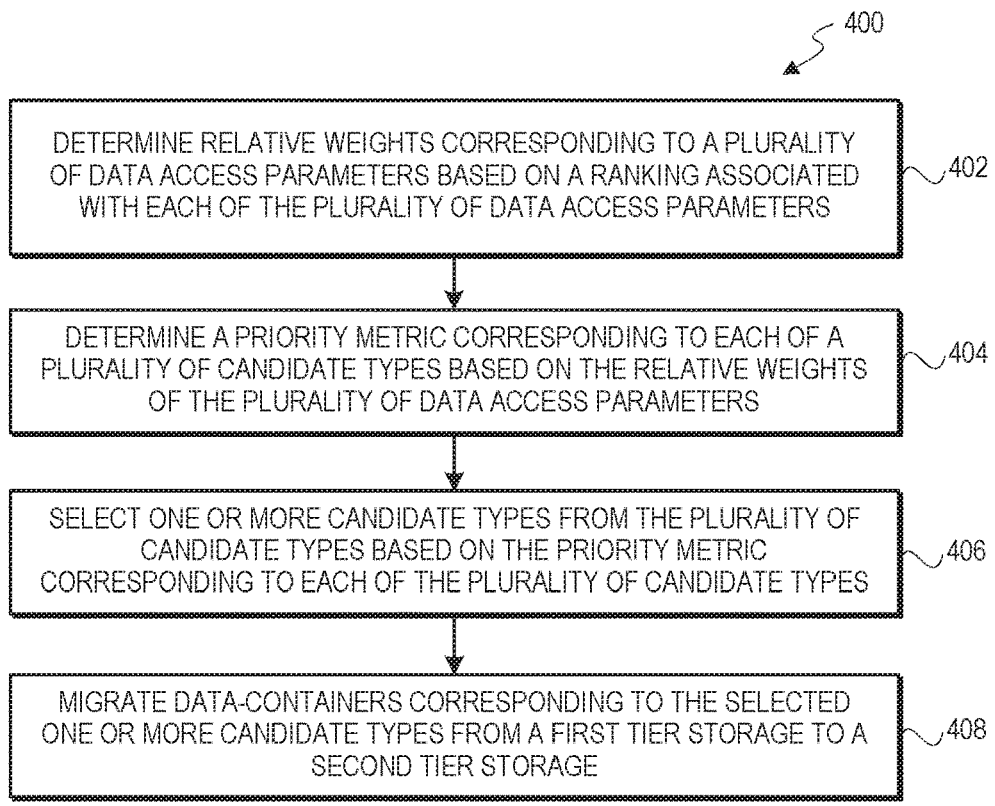
FIG. 4 is a flow diagram depicting a method for migrating data, in accordance with an example.

Moving to FIG. 4, a flow diagram depicting a method 400 for migrating data is presented, in accordance with an example. The method 400 is described in conjunction with the system 100 of FIG. 1. The method 400 may include method blocks 402, 404, 406, and 408. Method steps at the blocks 402, 404, 406, and 408 may be performed by a processor based system such as the virtual controller 128 or the processing resource 112.

The method 400, at block 402, may include determining, by the processor based system (e.g., the virtual controller 128), relative weights corresponding to the plurality of data access parameters based on the ranking associated with each of the plurality of data access parameters. As described hereinabove, the relative weights corresponding to the plurality of data access parameters may be determined based on the ranking associated with the data access parameters, a number of data access parameters, any user defined criteria, and the Ike. In some examples, to determine the relative weights, a pairs,vise comparison among the data access parameters may be performed. Additional details of the method of determining the relative weights corresponding to the plurality of data access parameters is described in conjunction with FIG. 1 and a method described in FIG. 5.

Further, at block 404, the virtual controller 128 may determine a priority metric corresponding to each of a plurality of candidate types based on the relative weights of the plurality of data access parameters. In some examples, for each candidate type, the virtual controller 128 may determine the priority metric based on the values of the candidate type corresponding to each data access parameter and the relative weights of each of the data access parameters (see FIG. 3 and Table-3 for example illustration). Furthermore, at block 406, the virtual controller 128 may select one or more candidate types from the plurality of candidate types based on the priority metric corresponding to each of the plurality of candidate types. Additional details regarding selection of the candidate types will be described in conjunction with the method described in FIG. 5.

Moreover, at block 408, the virtual controller 128 may migrate data containers corresponding to the selected one or more candidate types from the first tier storage 104 to the second tier storage 106. In some examples, in order to accomplish the migration of the data containers from the first tier storage 104 to the second tier storage 106, the virtual controller 128 may migrate the data containers from the first tier data store 120 to the second tier data store 12. Such changes in the data stores may be reflected in the respective storage tiers 104 and 106.

Figure 5:
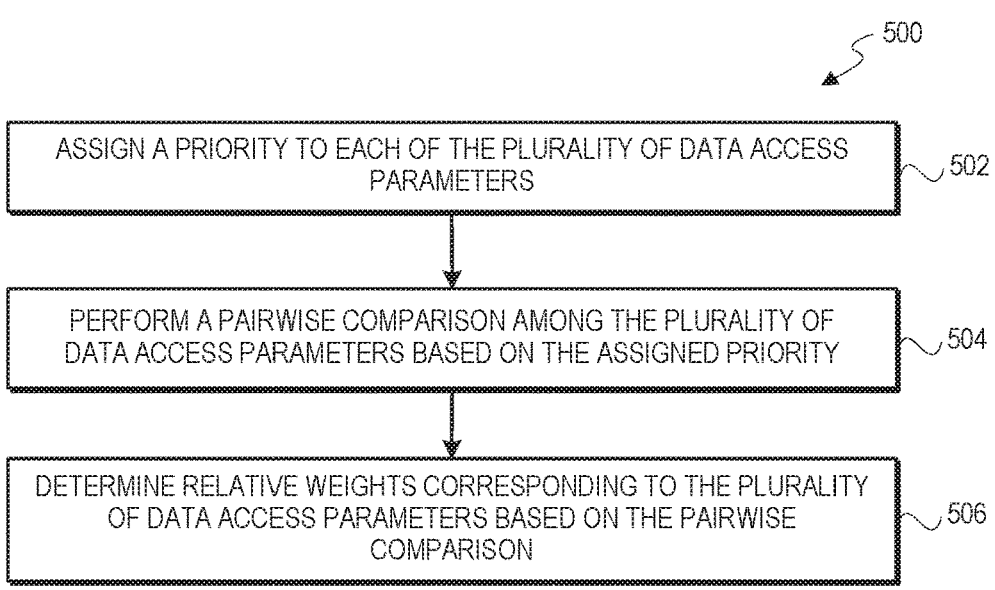
FIG 5 is a flow diagram depicting a method for determining relative weights corresponding to a plurality of data access parameters, in accordance with an example.

Referring now to FIG. 5, a flow diagram depicting a method 500 for determining the relative weights corresponding to a plurality of data access parameters, in accordance with an example. The method 500 may include method blocks 502, 504, and 506. In one example, the method 500 may represent sub-blocks of the block 402 of method 400. Method steps at the blocks 502, 504, and 506 may be performed by a processor based system such as the virtual controller 128 or the processing resource 112.

At block 502, a priority may be assigned to each of the plurality of data access parameters. In some examples, the priority may be assigned to a given data access parameter based on its relative importance/preference with respect to other data access parameter of the plurality of data access parameters. For instance, by assigning the priority an ordered list of the data access parameters may be obtained. Further, at block 504, a pairwise comparison among the plurality of data access parameters may be performed based on the assigned priority (see FIG. 2). Furthermore, at block 506, relative weights corresponding to the plurality of data access parameters may be determined based on the pairwise comparison based. An example of determining the relative weights is illustrated in a description of FIG. 1.

Figure 6:
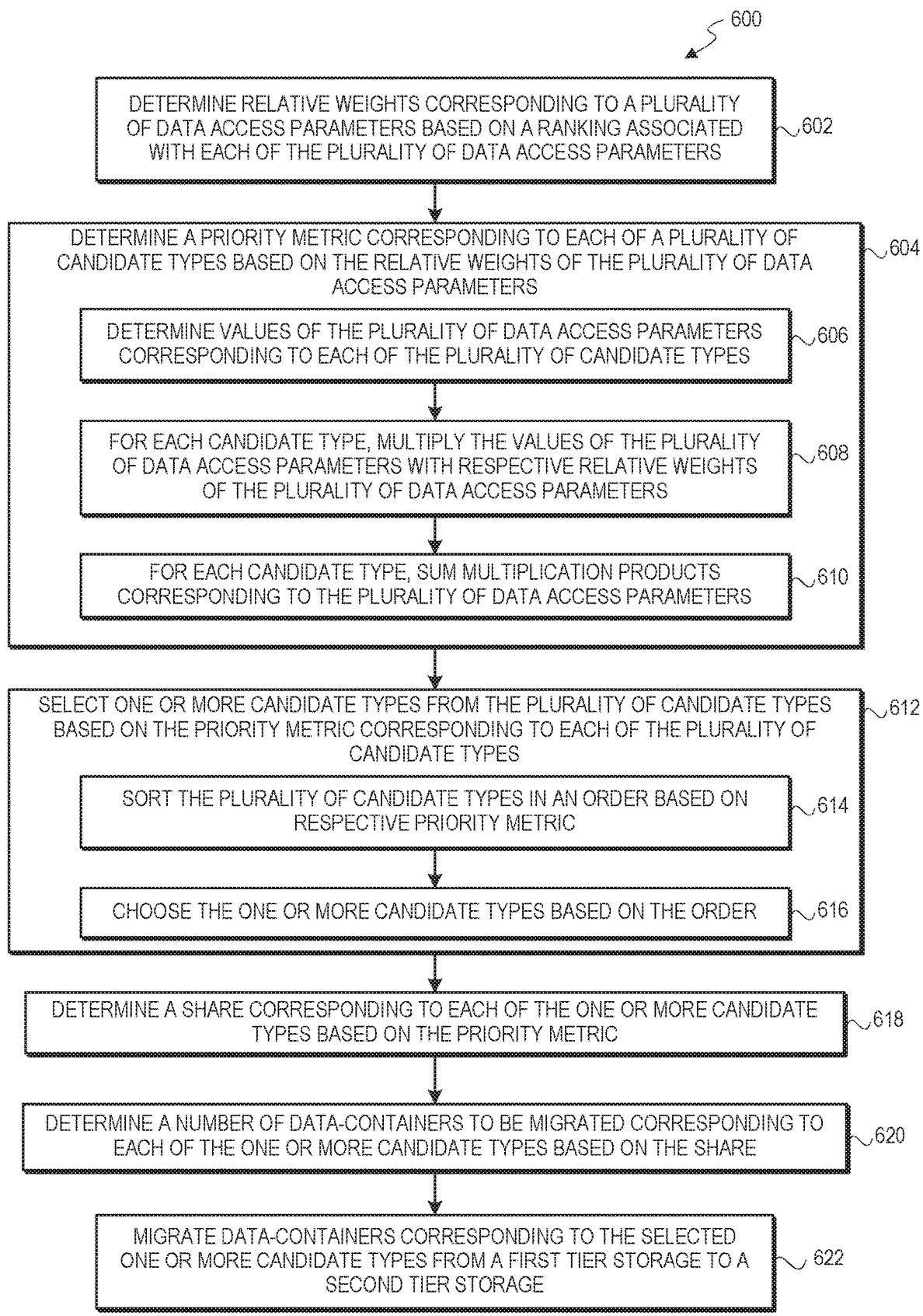
FIG 6 is a flow diagram depicting a detailed method for migrating data, in accordance with an example.

FIG. 6 is a flow diagram depicting an example detailed method 600 for migrating data, in accordance with an example. The method 600 will be described in conjunction with the system 100 of FIG. 1. Further, the method 600 of FIG. 6 includes certain block(s) that are similar to one or more blocks described in FIG. 4, details of which are not repeated herein for the sake of brevity. By way of example, a block 602 may be similar to the block 402, of FIG. 4. Also, method steps at various blocks depicted in FIG. 6 may be performed by a processor based system, for example, the processing resource 112/the virtual controller 128 by executing the instructions stored in the machine-readable medium 114.

At block 602, the processor based system (e.g., the virtual controller 128) may determine relative weights corresponding to the plurality of data access parameters based on the ranking associated with each of the plurality of data access parameters. Further, at block 604, the virtual controller 128 may determine a priority metric corresponding to each of the plurality of candidate types based on the relative weights of the plurality of data access parameters. In some examples, the method of determining the priority metric may include one or more sub-blocks 606, 608, and 610.

At block 606, the virtual controller 128 may determine values of the plurality of data access parameters corresponding to each of the plurality of candidate types. For example, in a given time window, the values of the Type-1 candidate corresponding to the waiter count, the data consumption trend, the filesystem metadata volume type, and the user data volume type are 10, 80%, 0, and 1, respectively (see Table-3). Similar data corresponding to other candidate types may also be collected by the virtual controller 128 in the given time window (see Table-3). Further, at block 608, for each candidate type, the virtual controller 128 may multiply the values of the candidate type corresponding to the plurality of data access parameters with respective relative weights of the plurality of data access parameters (an example is illustrated in FIG. 3).

Furthermore, at block 610, for each candidate type, the virtual controller 128 may sum multiplication products corresponding to the plurality of data access parameters. For example, as illustrated in FIG. 3. for the Type-1 candidate, the virtual controller 128 may sum values in the cells 312, 314, 316, and 318. Such sum of the multiplication products corresponding to the plurality of data access parameters for a given candidate type may represent a priority metric for the given candidate type.

Once the priority metrics corresponding to all of the data access parameters are determined, the virtual controller 128 may select one or more candidate types from the plurality of candidate types based on the priority metric corresponding to each of the plurality of candidate types, at block 612. In some examples, to select the one or more candidate types, the virtual controller 128 may sort the candidate types in an order based on respective priority metric, at block 614. For example, the virtual controller 128 may sort the candidate types in a descending order of the priority metric. Further, at block 616, the virtual controller 128 may choose the one or more candidate types based on the order. In one example, the virtual controller 128 may select a candidate type having the highest priority metric. In another example, the virtual controller 128 may select two or more candidate types that have higher priority metric in comparison to rest of the candidate types.

Further, in some examples, at block 618, the virtual controller 128 may determine a share corresponding to each of the selected candidate types based on the respective priority metric. In some examples, the share corresponding to each of the selected candidate types may be proportional to the respective priority metric.

Furthermore, in some examples, at block 620, the virtual controller 128 may determine a number of data containers to be migrated corresponding to each of the one or more candidate types based on respective share and a desired number of data containers to be migrated. For example, if a single candidate type is selected (at block 612), all of the desired number of data containers to be migrated are selected having the selected candidate type. In some examples, if more than one candidate types are selected (at block 612), the desired number of data containers to be migrated are divided according to respective shares of the selected candidate types. By way of an example, if shares of the Type-1 candidate, the Type-2 candidate, and the Type-3 candidate are 50%, 25%, and 25%, respectively, and the desired number of data containers to be migrated are 100; 50 data containers of Type-1 candidate, 25 data containers of Type-2 candidate, and 25 data containers of Type-3 candidate will be selected for migration.

In some instances, the number of data containers selected for a given candidate type may also depend on available data containers of the given candidate type. In such scenario, in some examples, remaining number of data containers may be selected from the next available candidate type in accordance with the order determined at block 614. Moreover, at block 622, the virtual controller 128 may migrate data containers corresponding to the selected one or more candidate types from the first tier storage 104 to the second tier storage 106. In some examples, in order to accomplish the migration of the data containers from the first tier storage 104 to the second tier storage 106, the virtual controller 128 may migrate the data containers from the first tier data store 120 to the second tier data store 122. Such changes in the data stores may be reflected in the respective storage tiers 104 and 106.

Figure 7:
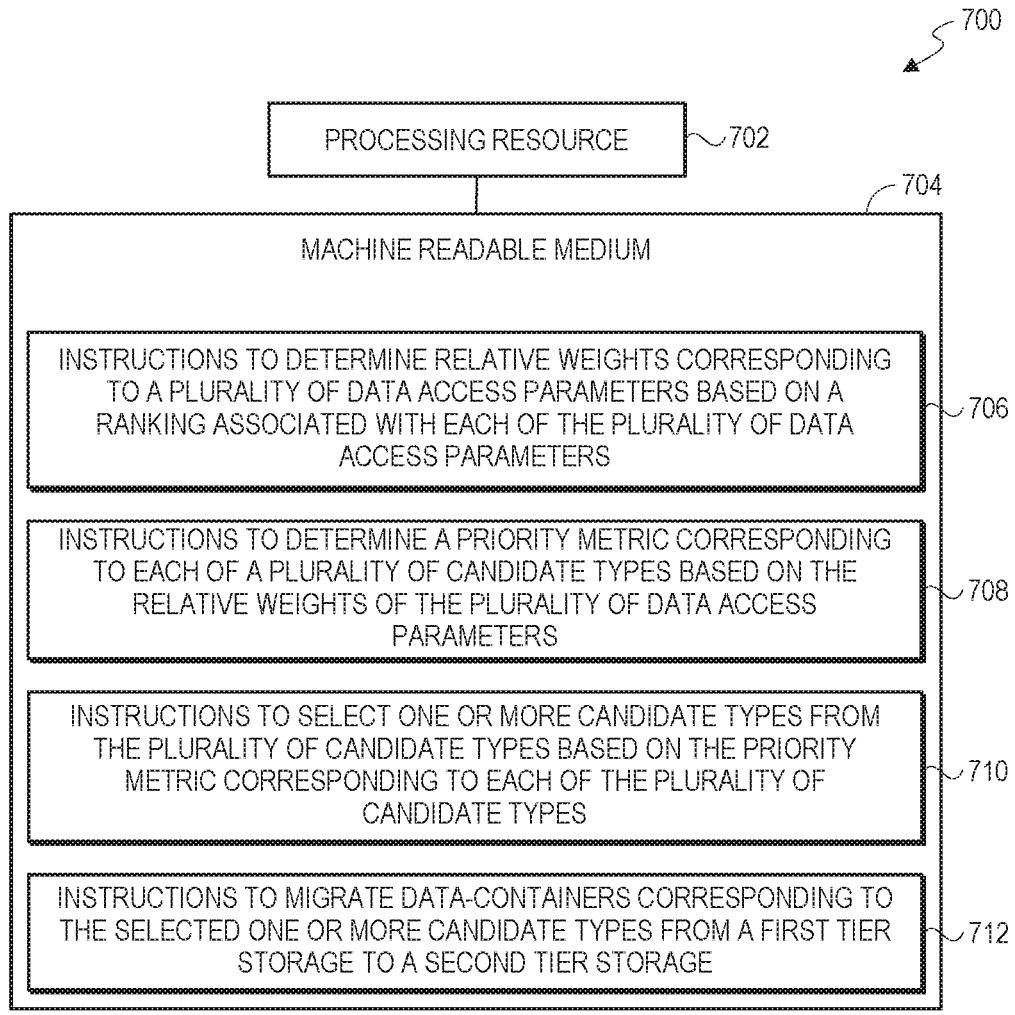
FIG. 7 is a block diagram depicting a processing resource and a machine-readable medium encoded with example instructions to migrate data, in accordance with an example.

FIG. 7 is a block diagram 700 depicting a processing resource 702 and a machine-readable medium 704 encoded with example instructions to facilitate migration of data, in accordance with an example. The machine-readable medium 704 may be non-transitory and is alternatively referred to as a non-transitory machine-readable medium 704. In some examples, the machine-readable medium 704 may be accessed by the processing resource 702. In some examples, the processing resource 702 may represent one example of the processing resource 112 of the system 100 of FIG. 1. Further, the machine-readable medium 704 may represent one example of the machine-readable medium 114 of the system 100.

The machine-readable medium 704 may be any electronic, magnetic, optical, or other physical storage device that may store data and/or executable instructions. Therefore, the machine-readable medium 704 may be, for example, RAM, an EEPROM, a storage drive, a flash memory, a CD-ROM, and the like. As described in detail herein, the machine-readable medium 704 may be encoded with executable instructions 706-712 for performing one or more methods, for example, the method 400 described in FIG. 4. Although not shown, in some examples, the machine-readable medium 704 may include additional instructions to perform the methods described in FIGS. 5 and 6.

The processing resource 702 may be a physical device, for example, one or more CPU, one or more semiconductor-based microprocessor, one or more GPU, ASIC, FPGA, other hardware devices capable of retrieving and executing of the instructions 706-712 stored in the machine-readable medium 704, or combinations thereof. In some examples, the processing resource 702 may fetch, decode, and execute the instructions 706-712 stored in the machine-readable medium 704 to manage migration of the data in the system 100. In certain examples, as an alternative or in addition to retrieving and executing the instructions 706-712, the processing resource 702 may include at least one IC, other control logic, other electronic circuits, or combinations thereof that include a number of electronic components for performing the functionalities intended to be performed by the virtual controller 128.

The instructions 706, when executed, may cause the processing resource 702 to determine relative weights corresponding to the plurality of data access parameters based on the ranking associated with each of the plurality of data access parameters. Further, the instructions 708, when executed, may cause the processing resource 702 to determine a priority metric corresponding to each of a plurality of candidate types based on the relative weights of the plurality of data access parameters. In some examples, for each candidate type, the virtual controller 128 may determine the priority metric based on the values of the candidate type corresponding to each data access parameter and the relative weights of each of the data access parameters (see FIG. 3 and Table-3 for example illustration). Furthermore, the instructions 710, when executed, may cause the processing resource 702 to select one or more candidate types from the plurality of candidate types based on the priority metric corresponding to each of the plurality of candidate types.

Moreover, the instructions 712, when executed, may cause the processing resource 702 to migrate data containers corresponding to the selected one or more candidate types from the first tier storage 104 to the second tier storage 106. In some examples, in order to accomplish the migration of the data containers from the first tier storage 104 to the second tier storage 106, the virtual controller migrate the data containers from the first tier data store 120 to the second tier data store 122. Such changes in the data stores may be reflected in the respective storage tiers 104 and 106.

As will be appreciated, example implementations presented herein facilitate selection of candidate types and allows migration of the data containers corresponding to the selected candidate types. Accordingly, storage wastage leading to partially filled data containers may be minimized and storage space in the multi-tiered storage system may be effectively utilized.

While certain implementations have been shown and described above, various changes in form and details may be made. For example, some features, functions, and/or formulas/equations that have been described in relation to one implementation and/or process can be related to other implementations. In other words, processes, features, components, and/or properties described in relation to one implementation can be useful in other implementations. Furthermore, it should be appreciated that the systems and methods described herein can include various combinations and/or sub-combinations of the components and/or features of the different implementations described.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method for migrating data, the method comprising:
   determining, by a processor based system, relative weights corresponding to a plurality of data access parameters based on a ranking associated with each of the plurality of data access parameters;
   determining, by the processor based system, a priority metric corresponding to each of a plurality of candidate types based on the relative weights of the plurality of data access parameters;
   selecting, by the processor based system, one or more candidate types from the plurality of candidate types based on the priority metric corresponding to each of the plurality of candidate types; and
   migrating, by the processor based system, data containers corresponding to the selected one or more candidate types from a first tier storage to a second tier storage.

2. The method of claim 1, wherein the plurality of data access parameters comprises a waiter count, a data consumption trend, a data type, or combinations thereof corresponding to the plurality of candidate types, wherein the data type comprises a filesystem metadata volume type or a user data volume type.

3. The method of claim 1, wherein each of the plurality of candidate types corresponds to a respective object size.

4. The method of claim 1, wherein determining the relative weights corresponding to the plurality of data access parameters comprises performing a pair-wise comparison among the plurality of data access parameters.

5. The method of claim 1, wherein the priority metric for each of the plurality of candidate types is determined based on values of the plurality of data access parameters corresponding to each of the plurality of candidate types and the relative weights corresponding to the plurality of data access parameters.

6. The method of claim 1, further comprising using, by the processor based system, a weighted decision matrix to determine the priority metric for each of the plurality of candidate types based on values of the plurality of data access parameters corresponding to each of the plurality of candidate types and the relative weights corresponding to the plurality of data access parameters.

7. The method of claim 1, wherein selecting the one or more candidate types comprises:
   sorting the plurality of candidate types in an order based on respective priority metric; and
   choosing the one or more candidate types based on the order.

8. The method of claim 1, further comprising
   determining, by the processor based system, a number of data containers to be migrated corresponding to each of the one or more candidate types based on one or more priority metrics corresponding to the one or more candidate types.

9. A system comprising:
a non-transitory machine-readable medium storing executable instructions; and
a processing resource coupled to the non-transitory machine-readable medium to retrieve and execute one or more of the instructions to:
determine relative weights corresponding to a plurality of data access parameters based on a ranking associated with each of the plurality of data access parameters;
determine a priority metric corresponding to each of a plurality of candidate types based on the relative weights of the plurality of data access parameters;
select one or more candidate types from the plurality of candidate types based on the priority metric corresponding to each of the plurality of candidate types; and
migrate data containers corresponding to the selected one or more candidate types from a first tier storage to a second tier storage.

10. The system of claim 9, wherein the plurality of data access parameters comprises a waiter count, a data consumption trend, a data type, or combinations thereof corresponding to the plurality of candidate types, wherein the data type comprises a filesystem metadata volume type or a user data volume type.

11. The system of claim 9, wherein each of the plurality of candidate types corresponds to a respective object size.

12. The system of claim 9, wherein the processing resource executes one or more of the instructions to perform a pair-wise comparison among the plurality of data access parameters to determine the relative weights corresponding to the plurality of data access parameters comprises.

13. The system of claim 9, wherein the processing resource executes one or more of the instructions to determine the priority metric for each of the plurality of candidate types based on values of the plurality of data access parameters corresponding to each of the plurality of candidate types and the relative weights corresponding to the plurality of data access parameters.

14. The system of claim 9, wherein the processing resource executes one or more of the instructions to use a weighted decision matrix to determine the priority metric for each of the plurality of candidate types based on values of the plurality of data access parameters corresponding to each of the plurality of candidate types and the relative weights corresponding to the plurality of data access parameters.

15. The system of claim 9, wherein, to select the one or more candidate types, the processing resource execute one or more of the instructions to:
sort the plurality of candidate types in an order based on respective priority metric; and
choose the one or more candidate types based on the order.

16. The system of claim 9, wherein the processing resource executes one or more of the instructions to
determine a number of data containers to be migrated corresponding to each of the one or more candidate types based on one or more priority metrics corresponding to the one or more candidate types.

17. A non-transitory machine-readable medium storing instructions executable by a processing resource, the instructions comprising:
instructions to determine relative weights corresponding to a plurality of data access parameters based on a ranking associated with each of the plurality of data access parameters;
instructions to determine a priority metric corresponding to each of a plurality of candidate types based on the relative weights of the plurality of data access parameters;
instructions to select one or more candidate types from the plurality of candidate types based on the priority metric corresponding to each of the plurality of candidate types; and
instructions to migrate data containers corresponding to the selected one or more candidate types from a first tier storage to a second tier storage.

18. A non-transitory machine-readable medium of claim 17, further comprising instructions to determine the priority metric for each of the plurality of candidate types based on values of the plurality of data access parameters corresponding to each of the plurality of candidate types and the relative weights corresponding to the plurality of data access parameters.

19. The non-transitory machine-readable medium of claim 17, wherein the instructions to select the one or more candidate types comprises instructions to:
sort the plurality of candidate types in an order based on respective priority metric; and
choose the one or more candidate types based on the order.

20. The non-transitory machine-readable medium of claim 17, further comprising instructions to
determine a number of data containers to be migrated corresponding to each of the one or more candidate types based on one or more priority metrics corresponding to the one or more candidate types.

* * * * *